(12) United States Patent
Cheng

(10) Patent No.: US 6,501,244 B2
(45) Date of Patent: Dec. 31, 2002

(54) METHOD AND APPARATUS FOR CONTROLLING A HIGH-SPEED AC PERMANENT MAGNET SYNCHRONOUS MOTOR COUPLED TO AN INDUSTRIAL TURBO ENGINE

(75) Inventor: Bing Cheng, W. Bloomfield, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 09/900,774

(22) Filed: Jul. 6, 2001

(65) Prior Publication Data

US 2002/0047682 A1 Apr. 25, 2002

Related U.S. Application Data

(62) Division of application No. 09/495,443, filed on Jan. 31, 2000.

(51) Int. Cl.$^7$ ................................................ H02P 3/18
(52) U.S. Cl. ................ 318/701; 318/779; 318/778; 318/723; 318/807; 318/276
(58) Field of Search ................ 318/779, 723, 318/778, 807, 276, 701; 290/27, 40

(56) References Cited

U.S. PATENT DOCUMENTS

| | | |
|---|---|---|
| 3,764,815 A | 10/1973 | Habock et al. |
| 3,840,799 A | 10/1974 | Macko |
| 4,371,823 A | 2/1983 | Lohest |
| 4,456,830 A | 6/1984 | Cronin |
| 4,565,957 A | 1/1986 | Gary et al. |
| 4,746,850 A | 5/1988 | Abbondanti |
| 4,772,802 A | 9/1988 | Glennon et al. |
| 4,786,852 A | 11/1988 | Cook |
| 4,818,890 A | 4/1989 | Mose et al. |
| 4,908,565 A | 3/1990 | Cook et al. |
| 4,949,021 A | 8/1990 | Rozman et al. |
| 5,055,700 A | 10/1991 | Ohyanchand |
| 5,144,564 A | 9/1992 | Naidu et al. |
| 5,363,032 A | 11/1994 | Hanson et al. |
| 5,428,275 A | 6/1995 | Carr et al. |
| 5,430,362 A | 7/1995 | Carr et al. |
| 5,493,200 A | 2/1996 | Rozman et al. |
| 5,581,168 A | 12/1996 | Rozman et al. |
| 5,594,322 A | 1/1997 | Rozman et al. |
| 6,037,752 A | 3/2000 | Glennon |

*Primary Examiner*—Karen Masih
(74) *Attorney, Agent, or Firm*—Seed IP Law Group PLLC

(57) ABSTRACT

A method and apparatus for controlling a permanent magnet synchronous motor (8) coupled to a turbo engine such that transient current and steady state current are minimized. The method comprises the steps of, for a given DC bus voltage, determining an acceleration profile as a function of a voltage-offset value, a low-speed rated speed value, a high-speed rated speed value, a first desired speed for warming up the turbo engine, and a second desired speed where the turbo engine has sufficient torque to accelerate to its rated speed without the aid of the permanent magnet synchronous motor (8).

4 Claims, 3 Drawing Sheets

METHOD AND APPARATUS FOR CONTROLLING A HIGH-SPEED AC PERMANENT MAGNET SYNCHRONOUS MOTOR COUPLED TO AN INDUSTRIAL TURBO ENGINE

CROSS-REFERENCE TO RELATED APPLICATIONS

This is a divisional of U.S. Pat. application Ser. No. 09/495,443 filed on Jan. 31, 2000.

TECHNICAL FIELD

The present invention relates to industrial turbo engines, and more particularly to a method for controlling high-speed permanent magnet motors that are coupled to industrial turbo engines.

BACKGROUND

Permanent magnet synchronous motors (PMSM) are widely used in motion controls, electric vehicles, and industrial turbo generators (ITG). PMSMs are typically coupled with engines to provide assistance to the engines at lower engine speeds. Because a turbo engine cannot start itself at zero speed, PMSMs using a starter inverter are needed to assist the turbo engine in accelerating to about half of its rated speed. At this speed, the turbo engine has sufficient torque to be driven to its rated speed without a PMSM.

To start a turbo engine, and specifically an industrial turbo engine, a starter inverter drives the PMSM, which is coupled to the turbo engine, to an initial desired speed to warm up the turbo engine. The starter inverter, which converts direct current (DC) into alternating current (AC), takes power from either batteries or a rectified grid. After the turbo engine is warmed, the drive is then increased to a second desired speed, typically about half of the rated speed of the turbo engine. The turbo engine will then take over the process without the aid of the AC motor and continue accelerating to nominal speed.

An "open-loop" volts per hertz control method is a commonly used AC motor control method. The volts per hertz (V/f) algorithm is used to run the motor at variable speeds. The V/f algorithm is very simple and inexpensive to implement in comparison to more sophisticated AC motor control algorithms. The "open-loop" control method varies the three-phase output frequency by adjusting the slope, or the ratio between frequency and voltage. Normally, a single straight-line V/f ratio is determined that drives the AC motor to the turbo uncoupling speed, where the turbo engine can produce sufficient torque to accelerate on its own to a desired speed without the aid of an AC motor. No sensing equipment is needed, the calculations are simpler and a less powerful, less expensive motor control unit (MCU) can be used.

One problem with the "open-loop" control method is that due to a possible wide range of DC bus voltages and the short accelerating time, typically about 12 seconds, for an industrial turbo engine to accelerate from 0–33,000 rpm, a single straight-line voltage per hertz ratio calculated by the "open-loop" method does not give a satisfactory dynamic response. In addition, the "open loop" control method often results in larger line current outputs at high speeds, or unacceptable steady state current at low speeds if a short accelerating time is required.

It is thus an object of the present invention to determine a control method for the high-speed PMSM that overcomes the problems associated with the open-loop control methods.

SUMMARY OF THE INVENTION

It is an object of the present invention to provide a control method for a very high-speed permanent magnet motors that provides a volts per hertz (V/f) profile from zero speed to very high-speeds. The V/f profile factors in the wide range of DC bus values and minimizes the line to line current to a permanent magnet generator (PMG) motor.

In one aspect of the preferred invention, a permanent magnet synchronous motor (PMSM) is coupled to an industrial turbo engine. A battery or other DC power supply sends a DC voltage to a starter inverter, which modulates the DC bus voltage to a three-phase AC voltage, and sends it to the PMSM. The PMSM controller has a V/f algorithm that determines a V/f profile for the given DC bus voltage to drive the PMSM to a speed at which the industrial turbo engine has sufficient torque to accelerate without the aid of the PMSM motor, typically about one-half of the rated speed of the industrial turbo engine. The algorithm creates a V/f profile along a pathway where steady state and transient current are minimized. The V/f profile created from the V/f algorithm is a function of a calculated voltage-offset value, an actual low-speed rated speed value, and an actual high-speed rated speed value. The algorithm takes into account the wide range of potential DC bus voltages from the battery, which may have different charge levels at different times.

Other objects and advantages of the present invention will become apparent upon considering the following detailed description and appended claims, and upon reference to the accompanying drawings.

DESCRIPTION OF THE PREFERRED EMBODIMENT(S)

Figure 1:
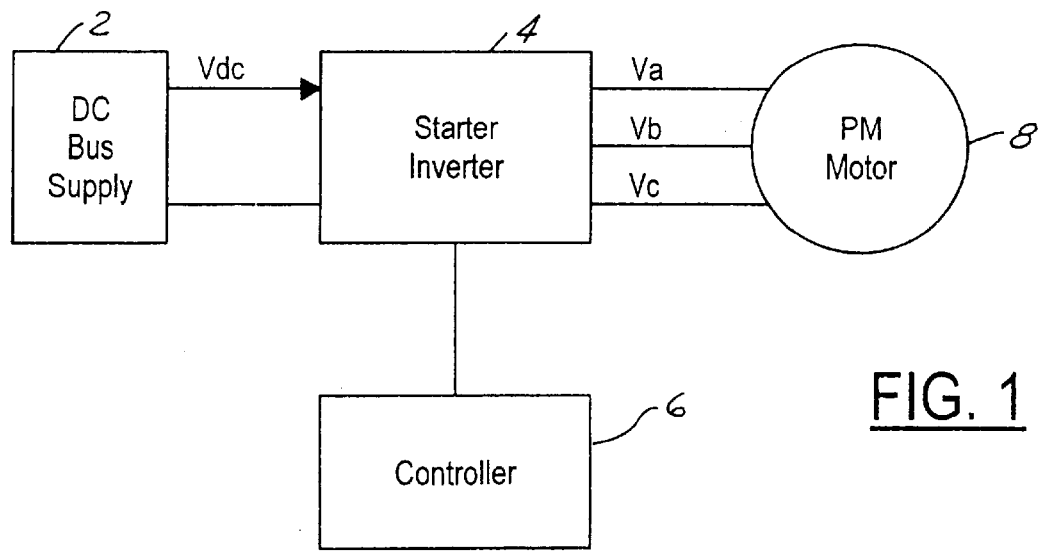
FIG. 1 is a simplified system diagram for a motor drive system.

FIG. 1 is a simplified system diagram for a motor drive system. The input to a starter inverter 4 is a DC power supply 2 (or battery) with a bus voltage level (Vdc). The output of the inverter 4 is a three-phase AC voltage signal (Va, Vb, Vc) to drive. a super high-speed permanent magnet (PM) motor 8. A controller 6, preferably microprocessor-based, directs the starter inverter 4 to drive the PM motor 8 from zero speed to a desired speed in such a way as to minimize transient and steady state current. The controller 6 drives the motor 8 along a V/f profile that is a function of a voltage-offset value, a low-speed rated speed value, and a high-speed rated speed value. The voltage-offset value, the low-speed rated speed value, and the high-speed rated speed value are determined by the controller 6 for a particular DC bus voltage based upon the individual characteristics of the motor 8 and the DC power supply 2.

Figure 2:
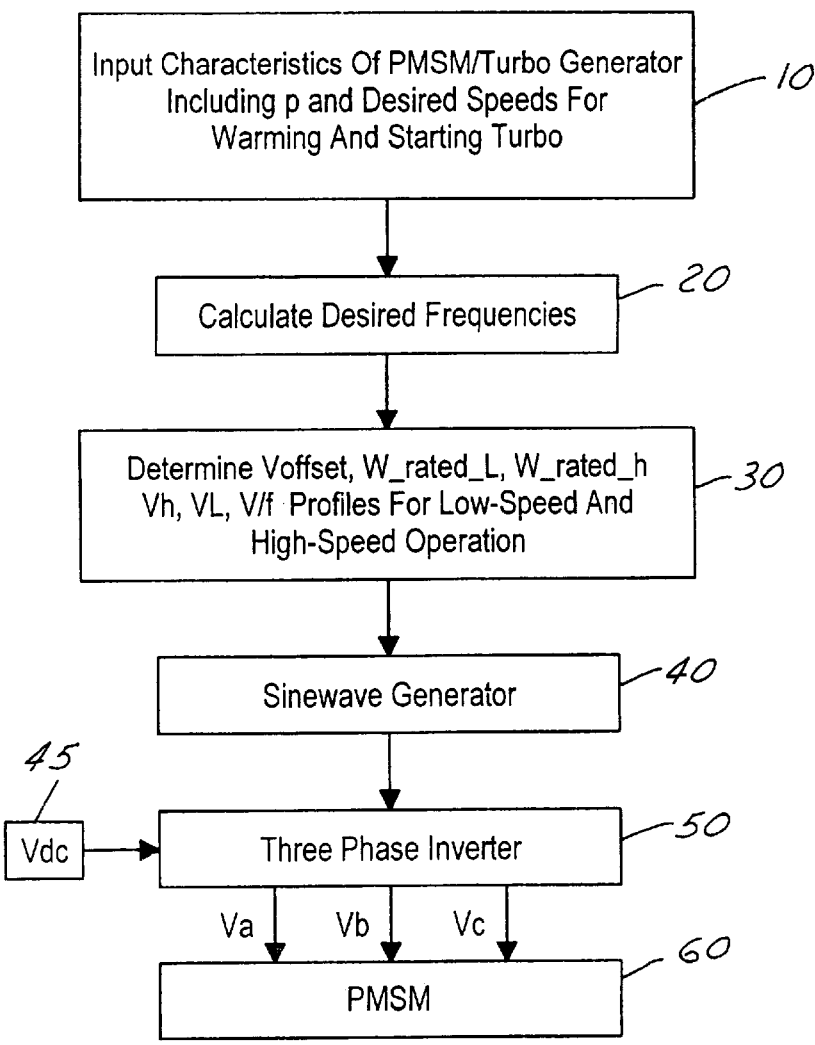
FIG. 2 is a logic flow diagram for the method according to a preferred embodiment.

FIG. 2 is a logic flow diagram for the method according to a preferred embodiment. In Step 10, the characteristics of the PMSM/turbo coupled engine are determined, including the number of poles (p) in the stator. Desired speeds required for the operation are also determined, such as the turbo starting speed (the speed at which the turbo engine is fired, typically around 8,000 rpm), the turbo engine warm-up speed and the turbo uncoupling speed. The desired frequencies (w or f) are then calculated in Step 20 based on this desired speeds indicated in Step 10 from the formula [f= (RPM)(p)/120].

In Step 30, a voltage-offset value is calculated, and a V/f profile is determined at low and high-speed operations from this voltage-offset value and from low and high-speed rated speed values. This V/f profile incorporates every possible DC bus voltage value. A more detailed description of Step 30 is detailed below in FIG. 3.

In Step 40, sinewaves for three-phases (a, b and c) are generated for the V/f profile and are sent to a three-phase inverter in Step 50. The three-phase inverter in Step 50 takes direct current (DC) from either a battery or a rectified power grid (Step 45) and modulates the DC current into an AC current having three-phases, designated Phase A, Phase B and Phase C. The three-phase current is fed into a stator winding of the PM motor in Step 60, which creates the motor action to accelerate the coupled turbo engine (not shown) to a desired speed.

Figure 3:
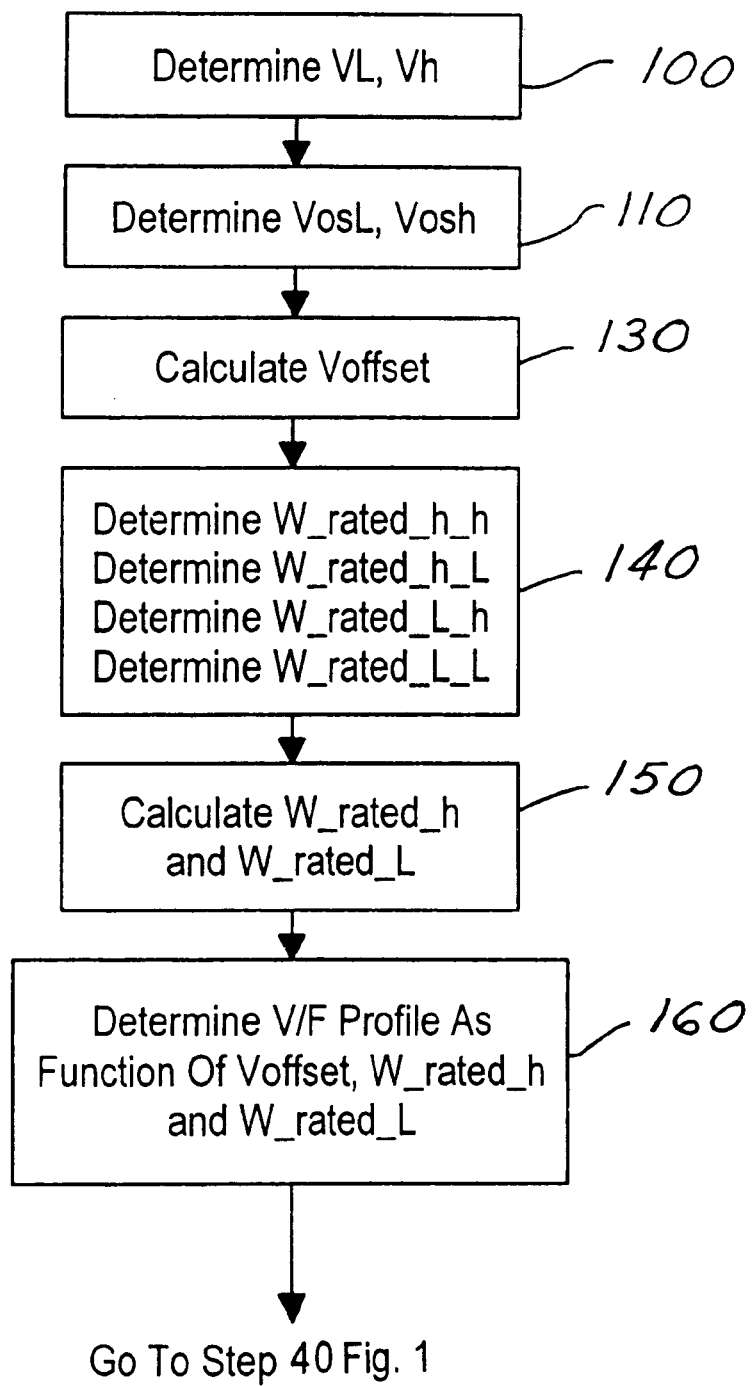
FIG. 3 is a V/f profile subroutine of Step 30 of FIG. 1 for determining the voltage-offset value and the actual speed value for low-speed and high-speed operations that minimize steady state and transient current.

FIG. 3 shows the V/f profile subroutine for determining the voltage-offset value and the V/f profile of Step 30 in FIG. 2 for all of the possible DC bus voltages. The V/f profile (algorithm) controls both the frequency and the AC voltage in a proportional fashion up to the nominal operating frequency (or rated frequency (w_rated)). Beyond this frequency, the AC voltage is held at its maximum value (V_max) while only the frequency is changed. The low boost voltage (v_offset) at zero speed is mainly dependent on the motor's IR drop and a required starting torque.

First, in Step 100, the low DC voltage level (Vl) and high DC voltage level (Vh) are determined by known methods for the batteries that supply DC current to the starter inverter. In a preferred embodiment of the present invention, Vl is 300 volts and Vh is 450 volts.

Next, in Step 110, a voltage-offset value for low DC voltage (Vosl) corresponding to Vl and a high DC voltage-offset (Vosh) are determined by known experimental methods.

Then, in Step 130, an auto calculated voltage-offset value (V_offset), that is a function of DC bus voltage set in Step 120, is determined as:

$$(V_{offset}=Vosl+((Vosh-Vosl)/(Vh-Vl))(Vdc-Vl))$$

where Vdc is the DC bus voltage that is measured for the system when the starter inverter is not switching.

Next in Step 140, optimal rated speed values for low DC bus voltages at low-speed operations (w_rated_l_l) and high-speed operations (w_rated_l_h) are determined by known methods. Also, optimal rated speed values for high DC bus voltages at low-speed operations (w_rated_h_l) and high-speed operations (w_rated_h_h) are determined by known methods.

To determine the v/f profile boundaries for low-speed and high-speed operations, an actual rated speed value for low-speed (w_rated_l) operations and high-speed (w_rated_h) operations must be calculated in Step 150. The calculations for determining w_rated_l and w_rated_h are:

$$w\_rated\_l=(w\_rated\_l\_l+((w\_rated\_l\_l\_h-w\_rated\_l\_l)/\{Vh-Vl\}))(Vdc-Vl))$$

$$w\_rated\_h=(w\_rated\_h\_l+((w\_rated\_h\_h-w\_rated\_h\_l)/\{Vh-Vl\}))(Vdc-Vl))$$

Figure 4:
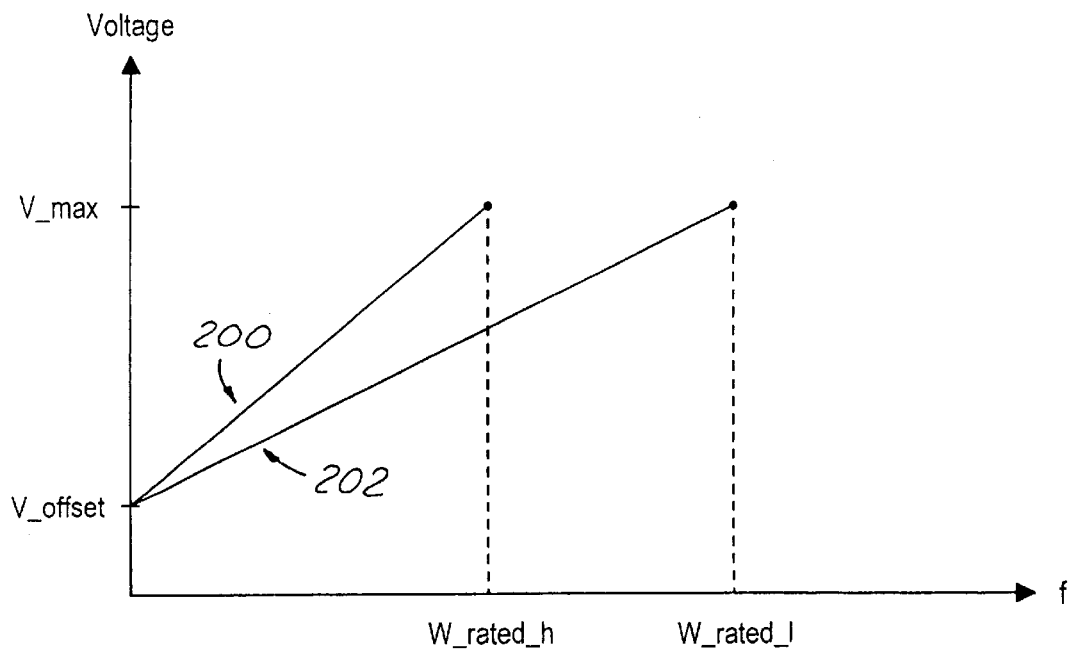
FIG. 4 is a V/f profile as determined in Step 160 of FIG. 3.

Next, a v/f profile that incorporates the V_offset value and the two rated speed values calculated above is profiled in Step 160. A lot of V_offset and the two rated speed values of Step 160 are shown in FIG. 4. Note that the voltage plotted on the y-axis is in terms of AC voltage. To create the profile, V_offset is first plotted at zero speed. The V_offset is necessary to adjust the starting current to account for stator resistance and starting torque. Second, w_rated_l, is plotted at Vl (V_max), and a straight line is drawn between the two points, shown as 202 in FIG. 4. Third, w_rated_h is plotted at Vh (V_max), and a straight line is drawn between the two points, shown as 200 in FIG. 4. This gives the profile that is used to determine how a PMSM motor will accelerate to its predetermined speed.

In operation, for an industrial turbo engine that is contemplated by the present invention, for any given DC bus voltage, the PMSM motor is driven from zero speed to a approximately 21,000 rpm, herein designated the turbo warm-up speed, where the industrial turbo engine coupled to the PMSM motor is warmed up for a maximum of 60 seconds. The industrial turbo engine is fired at approximately 8,000 rpm and remains coupled to the PMSM and the starter inverter. The PMSM motor is then accelerated from approximately 21,000 rpm to approximately 33,000 rpm, or around one-half of the rated speed for the industrial turbo engine. When approximately 33,000 rpm is reached, at the turbo uncoupling speed, the starter inverter will shut off and the industrial turbo engine will accelerate on its own to its desired speed, typically around the rated speed of the industrial turbo engine. At the point when the starter inverter is turned off and the turbo engine approaches its rated speed, the turbo engine drives the PMSM to generate electricity. When this happens, the PMSM is being used as a generator.

Figure 5:
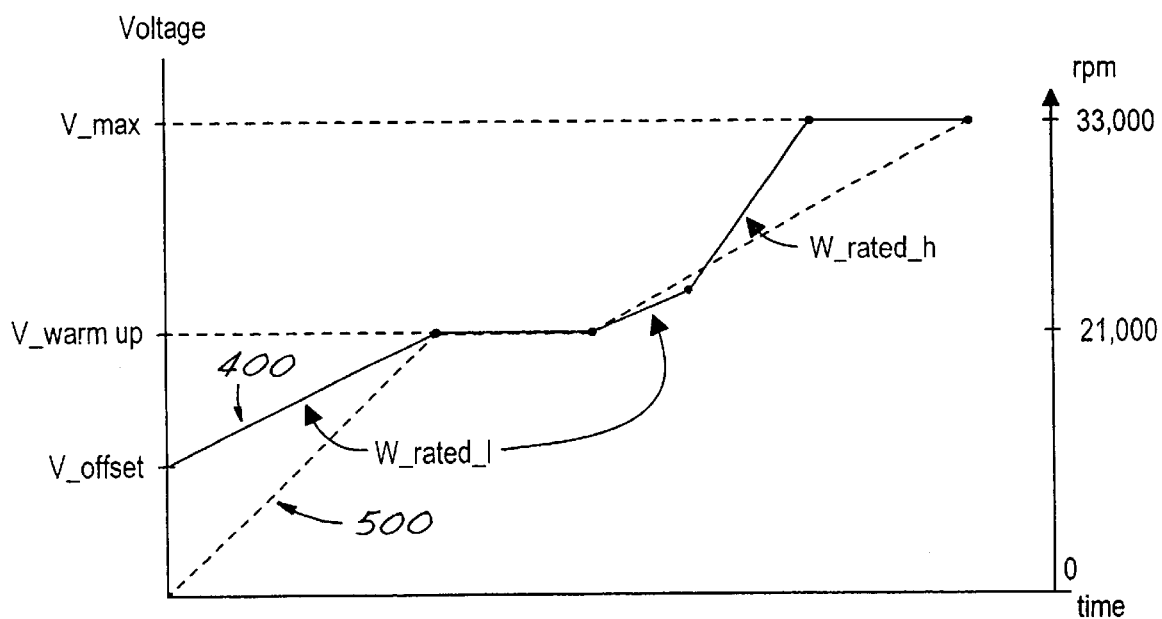
FIG. 5 is a plot of the voltage change as a function of time for driving the PMSM motor from zero speed to the turbo uncoupling speed and is a plot of the speed change as a function of time for driving the PMSM motor from zero speed to the turbo uncoupling speed.

FIG. 5 represents the voltage profile as a function of time (shown as 400 on FIG. 5) and the speed profile as a function of time (shown as 500 on FIG. 5) for driving the PMSM motor from zero speed to the turbo uncoupling speed according to a preferred embodiment of the invention.

In FIG. 5, for any given DC bus voltage, the starter inverter drives the PMSM coupled to an industrial turbo motor from zero speed to the turbo warm-up speed along the low-speed V/f profile line described above in FIG. 4. The turbo engine is fired at the turbo starting speed (not shown) at a point between zero speed and the turbo warm-up speed along the low-speed V/f profile. The PMSM motor is then held at the turbo warm-up speed at the corresponding voltage (designated V_warmup) until the industrial turbo engine warms up (for a maximum of 60 seconds). The PMSM motor is then accelerated along the low-speed V/f profile until it reaches a switching speed. The PMSM motor will then accelerate along the high-speed V/f profile described in FIG. 4 until it reaches V_max, or the maximum AC voltage allowed for the system. The PMSM motor is then accelerated to the turbo uncoupling speed by increasing the frequency while the voltage is maintained at V_max. The industrial turbo engine will take over and continue accelerating to the rated speed or desired speed. Note that the switching speed is between V_warmup and V_max.

While the invention has been described in terms of preferred embodiments, it will be understood, of course, that the invention is not limited thereto since modifications may be made by those skilled in the art, particularly in light of the foregoing teachings.

What is claimed is:

1. A method for driving a rotary machine coupled to a turbo engine at a predetermined DC bus voltage, the method comprising the steps of:

controlling the speed of the rotary machine as a function of a voltage-offset value, an actual low-speed rated speed value, and an actual high-speed rated speed value.

2. A method as in claim 1, wherein further comprising the step of determining a voltage-offset value as a function of a minimum voltage-offset value, a maximum voltage-offset value, a minimum DC bus voltage, a maximum DC bus voltage, and the DC bus voltage for the rotary machine.

3. A method as in claim 1, wherein further comprising the step of determining an actual low-speed rated speed value as a function of an optimal low-speed low DC voltage rated speed value, an optimal low-speed high DC voltage rated speed value, a minimum DC bus voltage, a maximum DC bus voltage, and the DC bus voltage for the rotary machine.

4. A method as in claim 1, wherein further comprising the step of determining an actual high-speed rated speed value as a function of an optimal high-speed low DC voltage rated speed value, an optimal high-speed high DC voltage rated speed value, a minimum DC bus voltage, a maximum DC bus voltage, and the DC bus voltage of the rotary machine.

* * * * *